United States Patent
Noris et al.

(10) Patent No.: US 9,123,145 B2
(45) Date of Patent: Sep. 1, 2015

(54) TEMPORAL NOISE CONTROL FOR SKETCHY ANIMATION

(75) Inventors: Gioacchino Noris, Zurich (CH); Daniel Sykora, Kalupy nad Vltavou (CZ); Stelian Coros, Zurich (CH); Alexander Hornung, Zurich (CH); Brian Whited, Glendale, CA (US); Maryann Simmons, Glendale, CA (US); Markus Gross, Zurich (CH); Robert Sumner, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 245 days.

(21) Appl. No.: 13/525,052

(22) Filed: Jun. 15, 2012

(65) Prior Publication Data

US 2013/0335426 A1 Dec. 19, 2013

(51) Int. Cl.
*G06T 13/00* (2011.01)

(52) U.S. Cl.
CPC .................................... *G06T 13/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,604,856 | A | * | 2/1997 | Guenter ........................ 345/473 |
| 2011/0188583 | A1 | * | 8/2011 | Toraichi et al. .......... 375/240.27 |
| 2011/0249086 | A1 | * | 10/2011 | Guo et al. .................. 348/14.12 |

OTHER PUBLICATIONS

A probabilistic filter for eliminating temporal noise in time-varying image sequences circuits and systems, ISCAS'92, proceedings AM Alattar—1992 IEEE International symposium on, 1992.*

Sykora, D., Dingliana, J., and Collins, S. "As-rigid-as-possible image registration for hand-drawn cartoon animations", In Proceedings of International Symposium on Nonphotorealistic Animation and Rendering, 2009, pp. 25-33.

Barrow, et al.: Parametric correspondence and chamfer matching: two new techniques for image matching, Proceedings of the 5th international joint conference on Artificial intelligence, 1977, pp. 659-663.

Lucas and Kanade: An iterative image registration technique with an application to stereo vision, Proceedings of Imaging Understanding Workshop, 1981, pp. 121-130.

Whited, B., Noris, G., Simmons, M., Sumner, R. W., Gross, M., and Rossignac, J. 2010. Between it: "An interactive tool for tight inbetweening." In Proceedings of Eurographics, Computer Graphics Forum, 2010, vol. 29, No. 2.

* cited by examiner

*Primary Examiner* — Leon T Cain, II
(74) *Attorney, Agent, or Firm* — Patterson + Sheridan, LLP

(57) ABSTRACT

Techniques are presented for controlling the amount of temporal noise in certain animation sequences. Sketchy animation sequences are received in an input in a digital form and used to create an altered version of the same animation with temporal coherence enforced down to the stroke level, resulting in a reduction of the perceived noise. The amount of reduction is variable and can be controlled via a single parameter to achieve a desired artistic effect.

24 Claims, 10 Drawing Sheets

STROKE INTERPOLATION

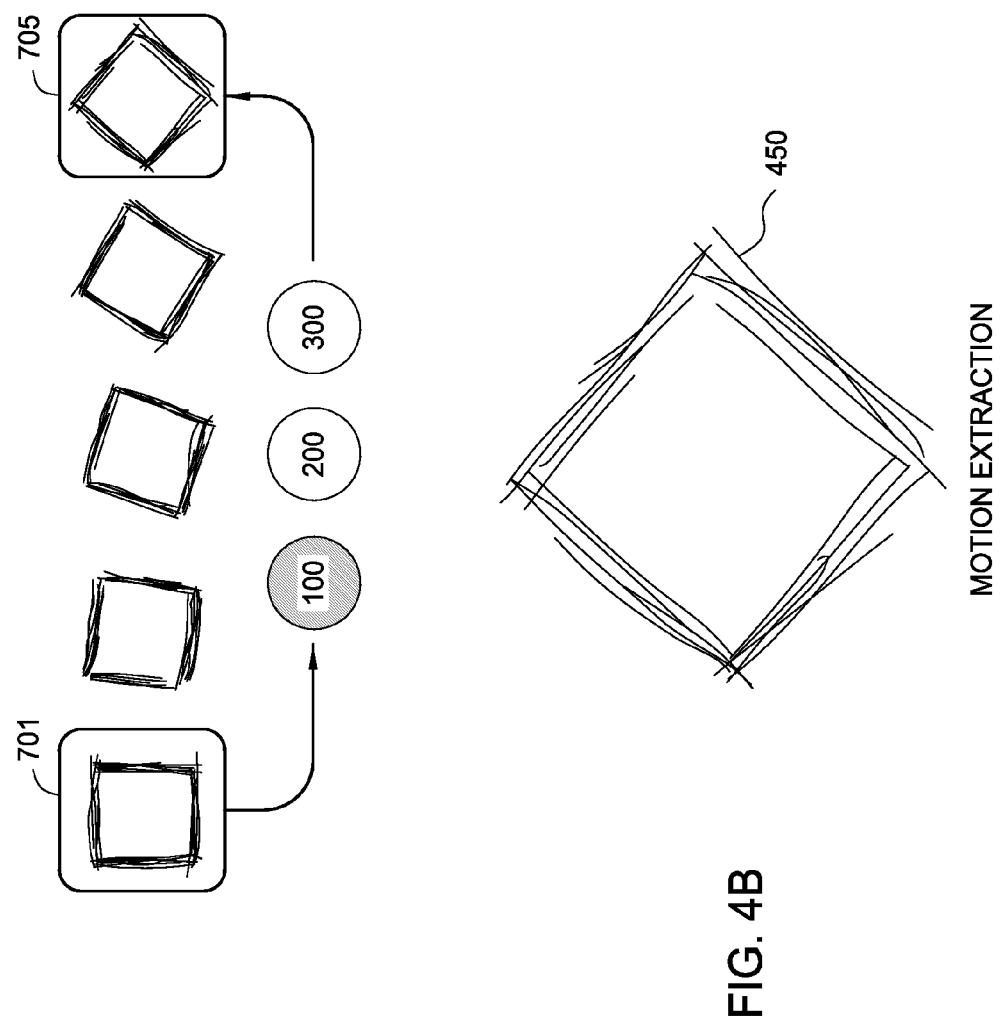

TEMPORAL NOISE CONTROL FOR SKETCHY ANIMATION

BACKGROUND

1. Field

Embodiments presented herein relate to computer based techniques for manipulating animation drawings. More specifically, embodiments presented herein provide an approach for controlling the amount of temporal noise in sketchy animation.

2. Description of the Related Art

Artists frequently compose "sketchy" animation frames to create an initial version or impression of an animated scene. For example, as part of drawing an initial representation of an animated scene, an artist may draw a sequence of animation frames by hand. The artist may draw outlines of the animated characters and objects using sets of distinct line strokes for each animation frame. Such "sketchy" animation is often used to present an initial view of an animation scene or for an artist to present a given look or aesthetic for characters in the scene. Once editorial direction for an animation project is finalized, the frames may be redrawn using more formal line drawing techniques.

Compared to such cleaned-up drawings, individual sketches (i.e., a single animation frame) present a distinctive visual richness, where both silhouette and interior lines are composed from many rough strokes. This style allows another dimension of expressiveness, e.g., emotion, action, and other features to be conveyed through the sketchy drawings. The richness of this style provides a form of geometric noise in a drawing. Despite the positive aspects in individual frames, geometric noise becomes temporal noise in sequences and often becomes aesthetically unpleasant to view.

One common solution is to remove the geometric noise entirely. In production environments, e.g., early versions of animation are often composed of sequences of rough sketches. Later in the production pipeline, the rough sketches are systematically replaced either with clean-line drawings or with renderings of 3D scenes, which typically present cleaner visuals. Animations completely made of sketchy frame are less common and generally confined to short sequences or small productions.

SUMMARY

Embodiments presented herein include a method for controlling temporal noise in an animation sequence, this method may generally include generating, for at least a first pair of frames in the animation sequence, a substantially noise-free animation sequence between the first pair of frames and generating, for each frame in the substantially noise-free animation sequence and a corresponding frame in the animation sequence, one or more in-between frames. The in-between frame may be used to control the temporal noise in the animation sequence.

In a particular embodiment, the step of generating the substantially noise-free animation sequence between the first pair of frames may include computing a motion field between the first pair of frames, determining, from the motion field, a stroke-to-stroke correspondence between a plurality of drawing strokes in the first pair of frames and, generating a plurality of animation frames in between the first pair of frames by interpolating between drawing strokes having the determined stroke-to-stroke correspondence in the first pair of frames. Further, in a particular embodiment, the step of generating, for each frame in the substantially noise-free animation sequence and a corresponding frame in the animation sequence may include computing a motion field between the frame in the substantially noise-free animation sequence and the corresponding frame in the animation sequence, and determining, from the motion field, a stroke-to-stroke correspondence between a plurality of drawing strokes in the substantially noise-free animation sequence and the corresponding frame in the animation sequence. This embodiment may further include generating a plurality of animation frames in between the substantially noise-free animation sequence and the corresponding frame in the animation sequence by interpolating between drawing strokes having the determined stroke-to-stroke correspondence in the first pair of frames.

Further still, in a particular embodiment, the method may further include varying the temporal noise in the animation sequence by selecting each frame of the animation sequence as one of an original frame of the animation sequence, a generated noise-free frame of the noise free sequence, and one of the one or more in-between frames.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description may be had by reference to the appended drawings.

It is to be noted, however, that the appended drawings illustrate only typical embodiments and are therefore not to be considered limiting of its scope.

FIGS. 4A-4B illustrate an example of motion extraction between two representative frames, according to one embodiment.

DETAILED DESCRIPTION

Figure 1:
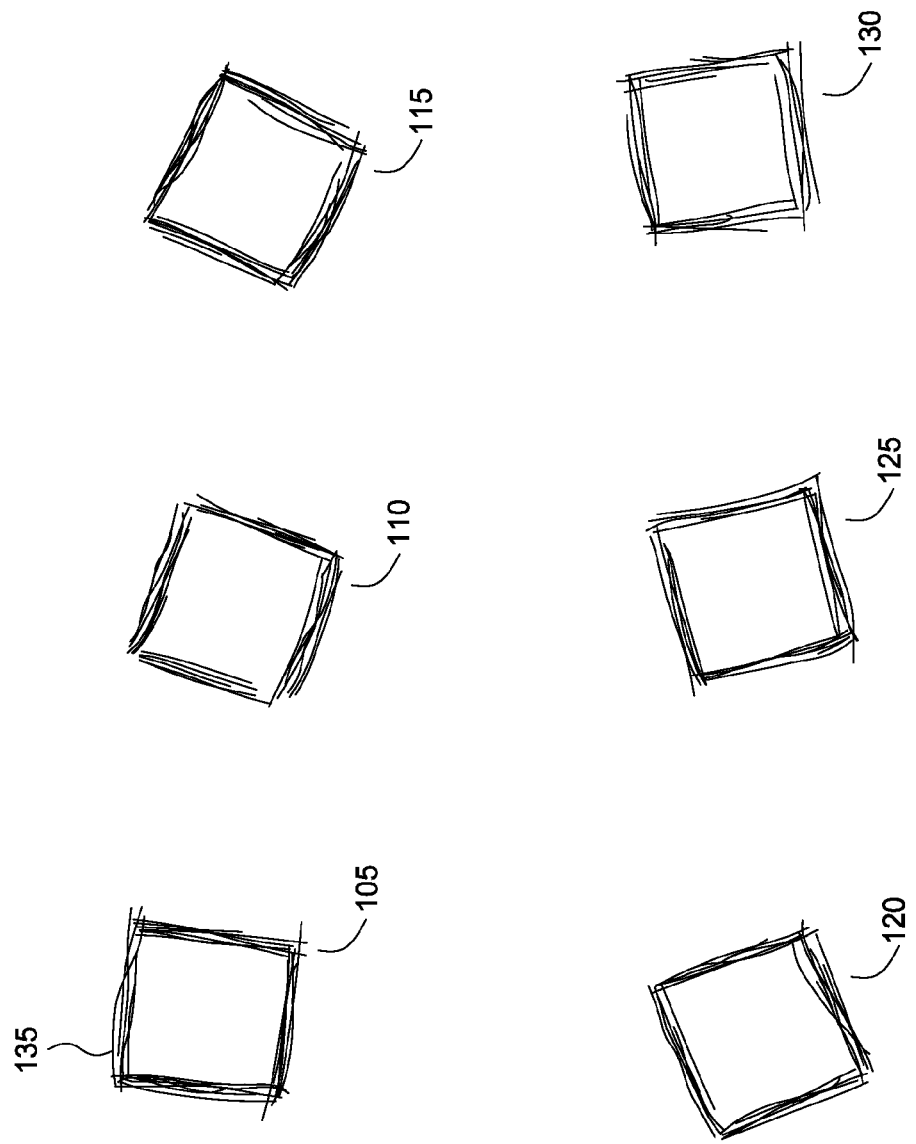
FIG. 1 illustrates an example sequence of sketchy animation frames, according to one embodiment.

Embodiments presented herein provide techniques to control the amount of temporal noise present in sketchy animations. For example, a sketchy animation sequence may be used as a base for producing an altered version of the same animation sequence with temporal coherence enforced down to the stroke level, from frame to frame. Doing so generally results in a reduction (or elimination) of the perceived noise. Embodiments presented herein provide an approach where the amount of noise reduction is variable over the animation and can be controlled via a single parameter to achieve a desired artistic effect.

More specifically, given an input animation sequence (typically drawn using digital composition tools), motion extraction, stroke correspondence, and in-betweening techniques are used to generate a reduced-noise sketchy animation registered to the input animation. In one embodiment, the motion extraction, stroke-to-stroke correspondence, and stroke in-betweening techniques are used to synthesize animation frames using a two-phase process. In a first phase, a noisy animation sequence (e.g., a "sketchy" animation) is sampled to select representative frames. For example, the sequence may be sampled every N frames or frames may be selected as the animation key-frames. For the interval between two samples (i.e., the interval between two representative frames), the motion extraction, stroke-to-stroke correspondence, and stroke in-betweening techniques are then used to generate a substantially noise-free version of the input animation sequence. The resulting animation sequence generally maximizes the amount of noise reduction that can be achieved for the input sequence and selected representative frames.

In phase two, once the noise-free sequence is produced, a variable amount of noise reduction is created by interpolating between frames in the input animation (full noise) and frames in the noise-free animation. To do so, every frame in the input animation is paired with the corresponding frame in the noise-free animation according to the time-line. For each such pair of frames, the motion extraction, stroke-to-stroke correspondence, and stroke in-betweening techniques are used to generate a number of frames, each one associated with a discrete noise level. For example, if ten interpolated frames are created between a given original frame and a corresponding noise free frame, then noise levels can be set in 10% increments.

The amount of noise is then controlled by a continuously variable parameter value. As a result, embodiments presented herein may be applied to effectively reduce the temporal noise present in sequences of sketches to a desired level or amount, while preserving the geometric richness of the sketchy style in each frame. Doing so allows an artist to manipulate the amount of temporal noise as an additional artistic parameter, e.g., to emphasize character emotions and scene atmosphere. Further, this approach enables "sketchy" content to be presented to a broader audience by producing animations with more comfortable noise levels and by strategically using greater nose levels to achieve a desired aesthetic effect.

To restate, the motion extraction, stroke-to-stroke correspondence, and stroke in-betweening techniques are used first "horizontally" to create a noise free animation sequence corresponding to the input sequence and then used again "vertically" to create a collection of frames with varying noise for each frame of the animation sequence. An artist can then select the amount of noise by selecting among the set of variable noise interpolated frames. Doing so provides an artist with a great degree of control over the amount of temporal noise in sketchy animation sequences.

The following discussion presents a variety of embodiments. However, the invention is not limited to the specifically described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates an example sequence of sketchy animation frames. As shown, the sequence includes frames 105-130. For this example, assume frames 105-130 are sampled from a larger animation sequence. Each frame 105-130 depicts a box shape, where each side of the box is drawn using a set of individual line strokes in each frame. Further, the animation rotates the box in a clockwise direction about its center over frames 105-130.

In this case, from frame 105 to frame 130, the box rotates through approximately 90 degrees. However, because each frame of the animation is drawn individually, the line strokes which make up of each side of the box do not correspond to one another from frame to frame. For example, between frames 105 and 110, side 135 of the box has rotated very little. At the same time, the set of lines used to represent the side 135 of the box are substantially different. That is, the lines from frame to frame are line strokes drawn independently of one another, even though these lines correspond to the same region of the animated object—the side 135 of the box. As a result, when animated over many frames, the line work of side 135 jumps in a temporally incoherent manner.

Figure 2:
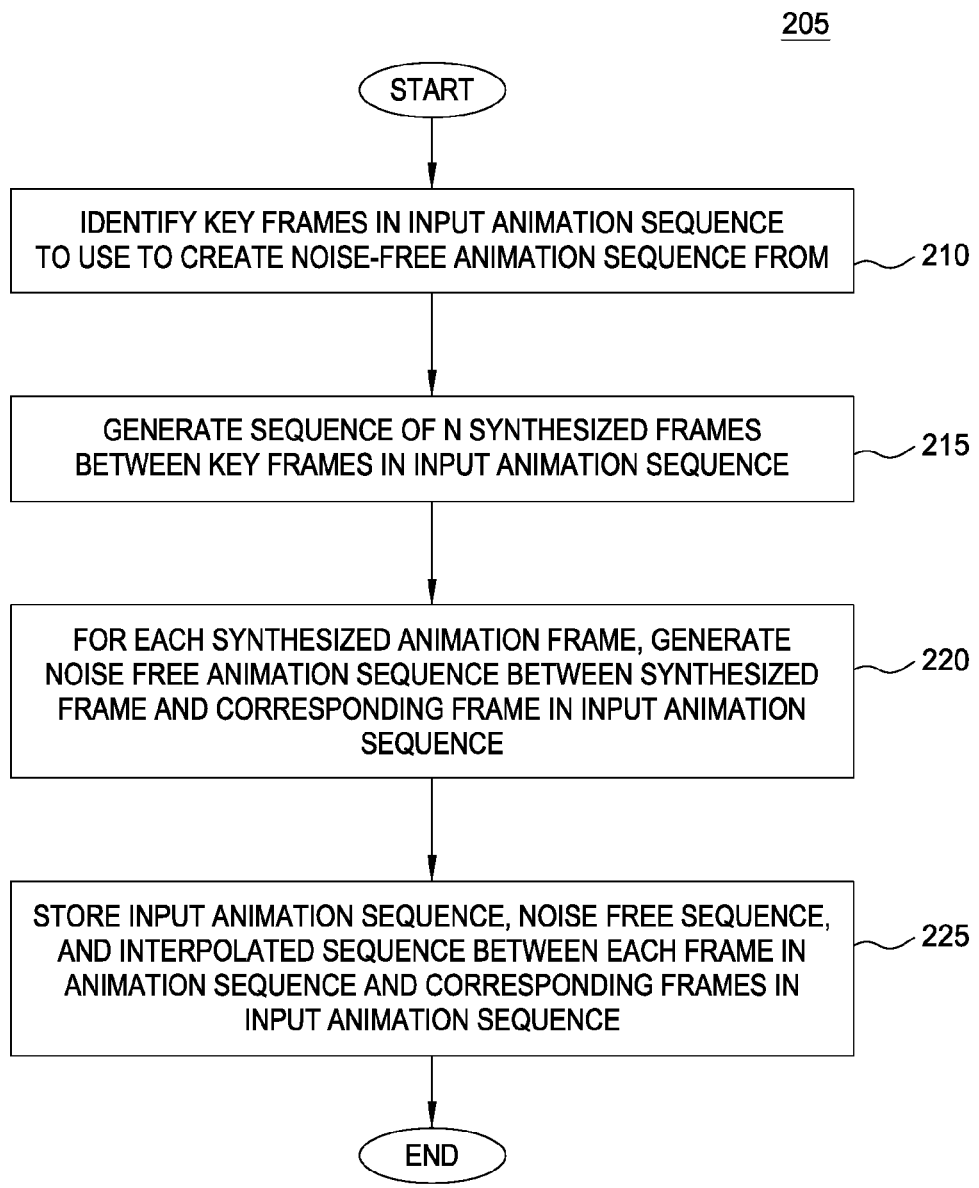
FIG. 2 illustrates a method for generating animation frames used to control temporal noise in animation sequences, according to one embodiment.

FIG. 2 illustrates a method 205 for generating animation frames used to vary temporal noise in animation sequences, according to one embodiment. As shown, the method 205 begins at step 210 where an artist selects representative frames to use in creating a noise free animation sequence. In one embodiment, this is done by sampling the original input animation to choose representative frames. Note, at this stage of the method 205, frames not in the representative subset are ignored.

During a first phase, a temporal noise control application generates a noise-free sequence which generally resembles the original animation as much as possible. Note, the sampling scheme (i.e. choice of representative frames) can substantially impact the quality of the resulting animation. Two examples of selection strategies for choosing representative frames include uniform sampling, which selects representative frames distributed at equal intervals specified by a window size "w," editorially selecting animation key frames, or selecting frames at motion "extremes."

Animation key frames use important or "extreme" frames that an artist manually selects from the original animation input. For example, an "extreme" frame may be selected as one where the motion of an object (or objects) reaches a maximum or inflection—e.g., consider an animation of a tree swaying in a breeze. In such a case, the "extreme" would correspond to the rightmost and leftmost positions of the tree, as depicted in the animation frames. More generally, key frames are any frames deemed interesting/critical in that they should be fully specified and not derived from adjacent frames.

In one embodiment, once the representative frames are selected at step 210, (whether as key frames or otherwise), a uniform division of time units inside each interval between the selected frames is assumed, resulting in an approximation of the input timing. Accordingly, the in-between frames can be generated at equal intervals between the two representative frames, or with some other sampling scheme. Alternatively, however, for a particular scene an artist may be provided with finer control, e.g., by allowing the artist to alter timing values used to generate the in-betweens frames. However, in discussing a reference example below, it is assumed that the animation key frame specification and timing information is available as input, along with the original animation. This is suitable for conventional animation environments, where both animation key frames and timing information are captured by timing charts.

At step 210, the sampled frames (whether selected editorially or as every N frames) are smoothly interpolated to create a new animation sequence having the same number of in-between frames as the original animation sequence. The output of step 210 is a set of smooth (i.e., noise free) in-between frames.

Figure 7:
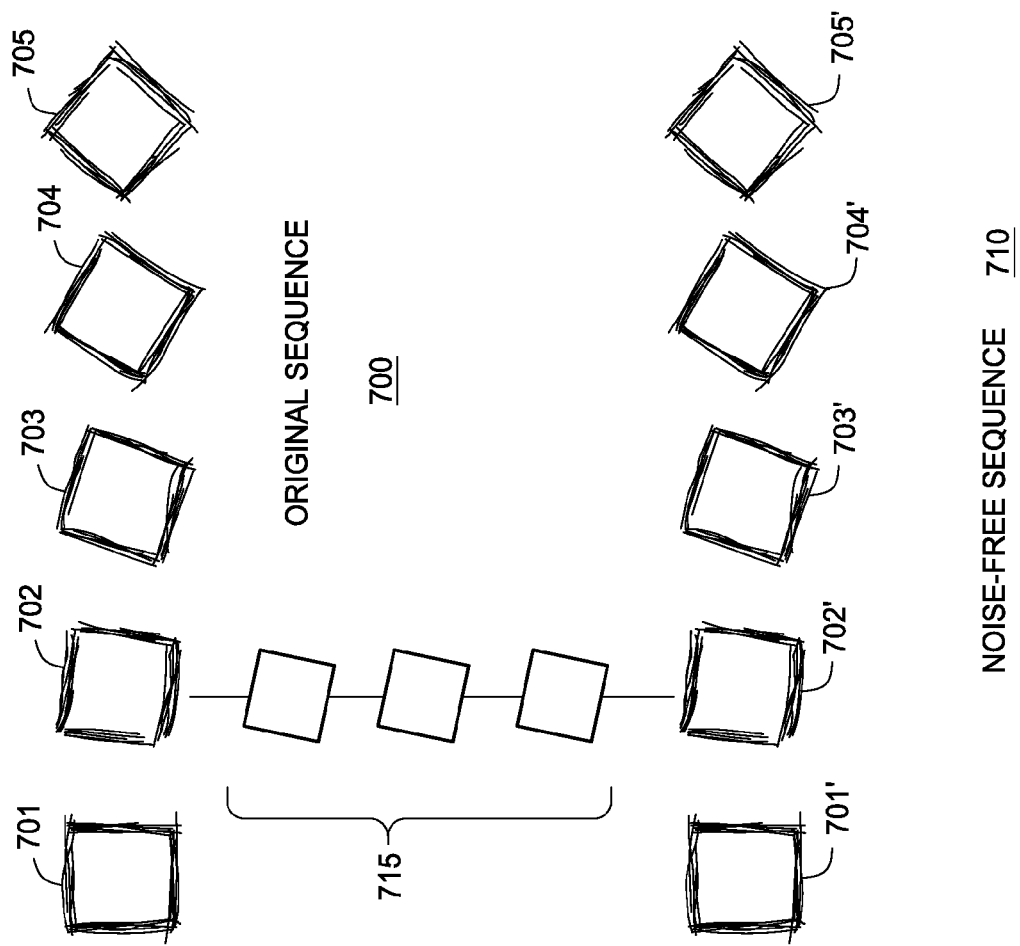
FIG. 7 illustrates an original sequence of animation frames and a corresponding noise free sequence between two representative frames of the original sequence, according to one embodiment.

For example, FIG. 7 illustrates an original sequence 700 of animation frames and a corresponding noise-free sequence 710. As shown, an original sequence 705 includes a beginning representative frame 701 and an ending frame 705. Noise-free sequence 710 also includes frames 701' and 705,' corresponding to beginning frame 701 and ending frame 705, respectively. Between frames 701 and 705 of the original sequence 700 are three animation frames. Each of these frames corresponds to a hand drawn "sketchy" frame drawn using a set of independent line work. Because there is no line work coherence between frames, the original sequence is relatively "noisy." The noise-free sequence also includes three frames between frames 701' and 705. In contrast to original sequence 700, frames of the noise-free sequence 710 exhibit a temporal coherence between each frame. That is, the line work of frame 701' corresponds to the line work of the next frame, as does each successive frame. In each frame, the line work of the previous frame is deformed or transformed, in a manner to create a noise-free animation transforming the appearance of the frame 701' to that of frame 705' over three in-between frames. A method for creating the noise-free in-between frames for frames 701 and 705 is described in greater detail below.

Referring again to method 205 of FIG. 2, once the noise-free animation sequence is created (step 215), a second noise free sequence is created for each frame of the original sequence (step 220) in-between a pair of representative frames. For example, the original sequence 700 of FIG. 7 includes frames 702, 703, and 704 in-between representative frames 701 and 705 and noise-free sequence 710 includes corresponding frames 702', 703', and 704'. In this example, a sequence of in-between frames is created between each pair of animation frames, 702 and 702', 703 and 703', and 704 and 704'. Note, the number of in-between frames for these sequences may be set as a matter of preference.

Creating a second noise free sequence for each pair of corresponding frames in the original and noise-free sequences results in an animation with multiple dimensions. In FIG. 7, for example, a first dimension—time—extends horizontally from frame 701 to frame 705 and from frame 701' to 705', and a second dimension—noise—extends vertically between each corresponding frame-pairs of these animations. By selecting from the vertical in-between frames 715, an artist may control the amount of temporal noise in the resulting "sketchy" animation, ranging from maximal (in the original sequence 700) to noise-free (in the noise-free sequence 710).

Referring again to method 205 of FIG. 2, once the in-between frames of step 220 are created, the input animation sequence, the noise-free sequence and the interpolation frames may be stored. Again, doing so allows the amount of temporal noise to be controlled over any range of frames in the animation.

Figure 3:
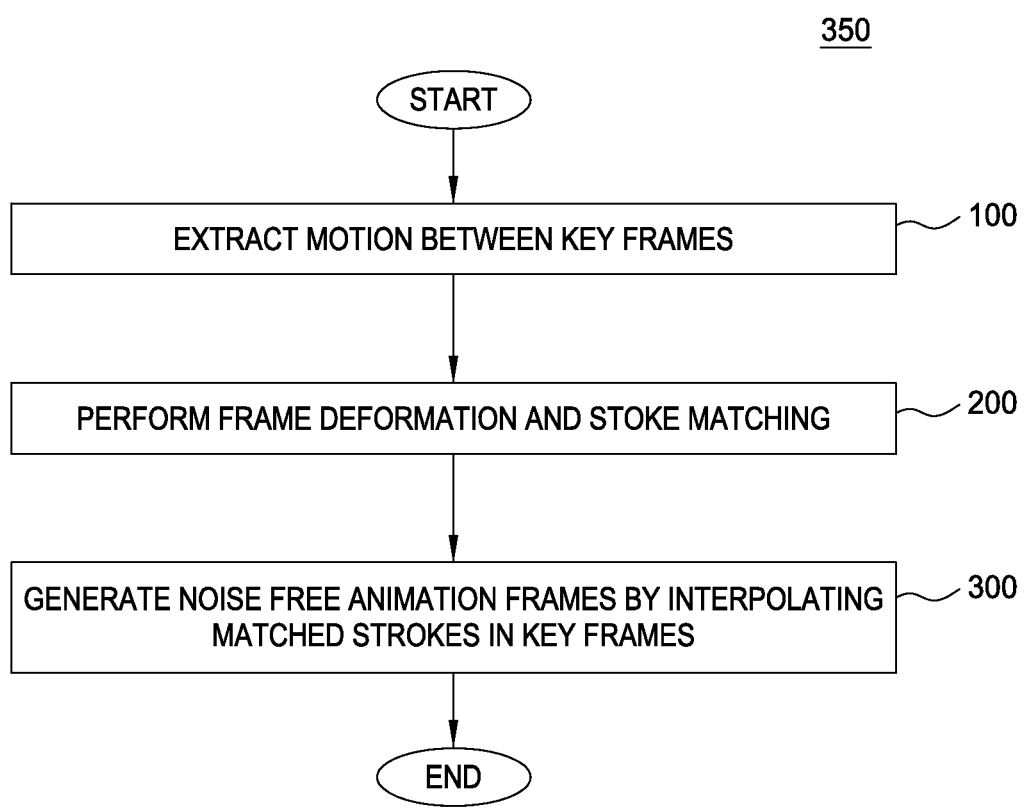
FIG. 3 illustrates a method for generating a sequence of synthesized animation frames between two frames, according to one embodiment.

FIG. 3 illustrates a method 350 for generating a sequence of synthesized animation frames between two input frames, according to one embodiment. Method 350 may be performed once to create a noise-free animation sequence between two representative frames of an input animation, and performed again to create a set of frames interpolating between the frames of the input animation and corresponding frames of the noise-free frames. Doing so allows an artist to vary the amount of temporal noise by selecting between the original frame, noise-free frame, and interpolated frames in building a final animation sequence.

As shown, the method 350 begins at step 100 where a software application configured to generate the in-between frames extracts motion between two input frames of an animation sequence. At step 200, the software application performs frame deformation and stroke matching between the input frames. At step 300, the software application generates one or more in-between frames by interpolating the matched strokes in the frames. Details of steps 100, 200, and 300 are discussed below.

More formally, the steps of method 350 operate on sequences of frames, where each frame F contains a set of strokes s that appear in the animation at the same moment in time. Each stroke s may be defined as a piece-wise linear curve defined by a sequence of vertices. The $i^{th}$ stroke in a frame F is given by F(i). A motion field is a function $M: \mathbb{R}^2 \rightarrow \mathbb{R}^2$ that tracks the movement of every point on the 2D canvas. In particular, $M_{F_1}^{F_2}$ is a motion field that describes the relative motion between frames $F_1$ and $F_2$. Further, D(M,F) may be defined as a deformed frame obtained by taking the vertices of every stroke in F and displacing them according to M. Table 1, below, shows an algorithm corresponding to the method 350 using this terminology:

TABLE 1

Create In-between frames:

1: input $F_1, F_2$ : animation frames
2: input t : interpolation parameter, 0 ≤ t ≤ 1
3: output $F_t$ : an in-between frame
4: $\hat{F}_1 \leftarrow D(M_{F_1}^{F_2}, F_1)$
5: S ← compute Stroke CorrespondencePairs($\hat{F}_1, F_2$)
6: $F_t \leftarrow \{\}$
7: for all (i,j) ∈ S Do
8:    s ← interpolateStrokes($F_1(i), F_2(j), t$)
9:    $F_t \leftarrow F_t \cup \{s\}$
10: end for The algorithm shown in Table 1 describes steps to create smooth in-between frames for two input frames. As noted, embodiments use a two-phase approach where the method 350 is performed twice, "horizontally" during a first phase to create a noise free sequence between selected frames, and "vertically" during a second phase between corresponding frames of the input sequence and noise free sequence. The second phase creates, for each frame of the input sequence (including non-representative frames), a set of in-between frames with varying noise.

In the reference algorithm listed in Table 1, the input consists of a pair of animation frames, $F_1$ and $F_2$, and an interpolation parameter t, 0≤t≤1. The objective is to create a new frame $F_1$ using solely the strokes from frames $F_1$ and $F_2$. Doing so ensures continuity in the strokes that are output as t varies between 0 and 1, and thus results in smooth animations. The first step towards creating smooth in-between frames includes identifying pairs of strokes from $F_1$ and $F_2$ that represent the same features in the animation at different moments in time. In one embodiment, every stroke in one input frame is matched to the most likely candidate stroke from the other frame, as expressed by a stroke correspondence measure (step 200).

However, strokes that define the same element in a drawing (e.g. a portion of the silhouette) can be far apart spatially from frame to frame. Similarly, strokes that represent different elements of the drawing can become spatially close. As a result, computing appropriate stroke-to-stroke correspondences can be a challenging task, since proximity is not a reliable measure of similarity. To mitigate this issue, in one embodiment, the stroke correspondence measure is determined after deforming the strokes of $F_1$ according to a motion field given by particular, $M_{F_1}^{F_2}$ (step 100). More precisely, the application computes a stroke-to-stroke correspondence between the frames $\hat{F}_1 \leftarrow D(M_{F_1}^{F_2}, F_1)$ and $F_2$. In general, the spatial distances between the strokes in the deformed version of $F_1$ and $F_2$, tend to be significantly smaller, so computing stroke-to-stroke correspondences becomes less prone to mismatches. The stroke-to-stroke correspondence step results in a set of pairs (i,j), where each pair indicates a correspondence between stroke i of $F_1$ and stroke j of. All pairs of corresponding strokes are then interpolated to create the in-between frames (step 300).

As noted, step 100 of the method 350 includes computing a coarse motion field, between two frames $F_1$ and $F_2$. In one embodiment, a modified version of an "As-Rigid-As-Possible" (ARAP) image registration method may be used. One example of an ARAP image registration method is further described in SYKORA, D., DINGLIANA, J., AND COLLINS, S. 2009. "As-rigid-as-possible image registration for hand-drawn cartoon animations" (Sykora '09), In Proceedings of International Symposium on Nonphotorealistic Animation and Rendering, pp. 25-33, incorporated by reference herein in its entirety. Note, the principal ARAP image registration approach assumes a mask of the registered image is known beforehand, which allows a control lattice, (representing the coarse motion field $M_{F_1}^{F_2}$), to be adapted to the topology variations of the underlying shape. Further, the ARAP image registration process is coarse as it provides only an approximation of an actual motion field M between $F_1$ and $F_2$. However, for controlling temporal noise in sketchy animation, using a coarse (and thus more readily computable) motion field has proven to be effective.

Determining motion between two frames presents a somewhat more complicated scenario, as the input provides an unordered set of strokes without any connectivity information, i.e., a mask of the registered image is not known beforehand. However, it is preferable to take into account the topology of the input frame, as opposed to using a uniform grid. Accordingly, in one embodiment, a rasterized distance field may be used as the mask. The rasterized distance field approximates or measures distances from points in the mask to the nearest drawing stroke. The computed distance field closes small gaps between the input strokes. In addition, the distance field provides a better cue for image registration. Additional examples of using a distance field as a cue for image registration are described in BARROW, et al.: Parametric correspondence and chamfer matching: two new techniques for image matching, Proceedings of the 5th international joint conference on Artificial intelligence, pp. 659-663, 1977, incorporated by reference herein in its entirety.

Further, in one embodiment, a hierarchical coarse-to-fine refinement may be used in addition to the distance field. For example, a multi-resolution pyramid may be generated by recursively reducing an image scale by a factor of two. The motion field extraction process then proceeds from the coarse to fine level and a registration algorithm runs with a control lattice of constant quad size. When moving up each level, a pixel accurate motion field is rendered to initialize the position of the control points on the finer lattice. Doing so may help to speed up the convergence of the motion field extraction algorithm and increase robustness under large motions. The hierarchical refinement can also adapt to fine details and provides a tight image registration (i.e., highly correlated). Additional examples of using a hierarchical coarse-to-fine image registration process are described in LUCAS and KANADE: An iterative image registration technique with an application to stereo vision, Proceedings of Imaging Understanding Workshop, pp. 121-130, 1981, incorporated by reference herein in its entirety.

As noted in Sykora '09, the image registration algorithm can potentially get trapped in a local optimum. While these cases are uncommon, animation software application generating the variable noise animation may allow the user to drag-and-drop selected control points in order to guide the algorithm towards a better solution. In one embodiment, this may be implemented simply by (1) dragging the selected control point to a desired pose (a soft constraint) or (2) fixing the position of the selected control point (a hard constraint).

Figure 4A:
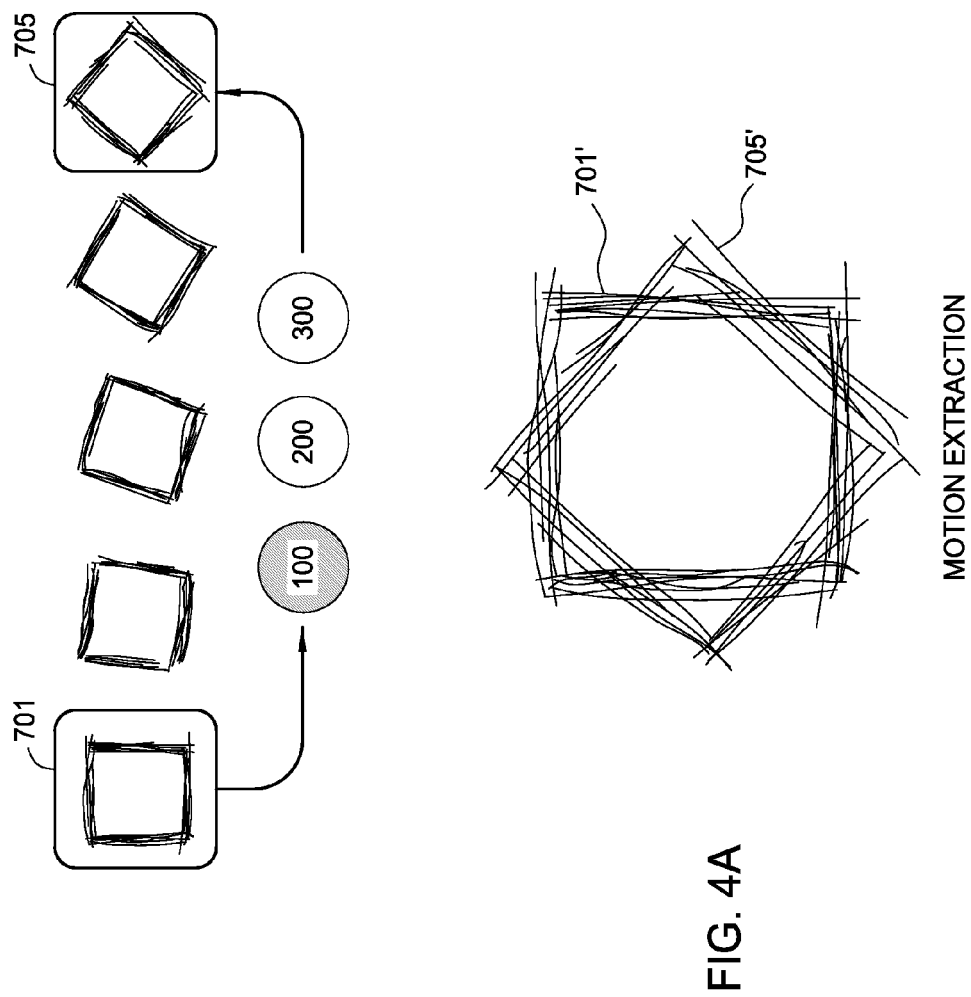

FIGS. 4A-4B illustrate an example of motion extraction (step 100) between two representative frames, according to one embodiment. As shown in FIG. 4A, a motion field is determined between a beginning frame 701 and an ending frame 705. The motion field is used to determine how to deform frame 701' in order to match frame 702. As noted, in one embodiment, the deformation process may use an ARAP image registration method to determine how to deform frame 701 (frame $F_1$) to match frame 705. In this particular example, a rigid rotation of frame 701 and then some deformations of the line strokes of each side of the box result in a deformation of frame 701. FIG. 4B shows this result for frames 701' and 705'. More specifically, as shown in FIG. 4B, a coarse motion field is determined between a beginning frame 701 and an ending frame 705. Frame 701 is deformed to match frame 405. That is, FIG. 4B depicts frame 701 in FIG. 4B as frame 450, which provides a coarse match to frame 705.

Once the motion field between two representative frames is determined, in-between frames may be generated to match the extracted motion flow field. To do so, a stroke-to-stroke correspondence is determined between each stroke in the initial input frame and the ending frame. The motion field determined at step 100, $M_{F_1}^{F_2}$, represents the relative motion between frames $F_1$ and $F_2$. And this relative motion provides a way of estimating the location of each stroke from $F_1$, if it had been drawn at the time represented by frame $F_2$. That is, the motion flow allows a final position of a stroke in frame $F_1$ to be estimated after the motion flow is applied. The position of a stroke from frame $F_1$ can then be compared to the strokes in frame $F_2$. The computation of the deformed frame proceeds where the vertices v (which are simply 2-dimensional points on the digital canvas) defining the strokes in $F_1$ are displaced according to the motion field: $v \leftarrow v + M_{F_1}^{F_2}(v)$.

The stroke to stroke correspondence step is used to compute a measure of how well two strokes from different frames will interpolate. Intuitively, the better aligned and spatially close the two strokes are, the better their correspondence measure should be. In one embodiment, the correspondence measure between two strokes $s_1$ and $s_2$ may be defined as $h(s_1,s_2)*h(s_2,s_1)$, where $h(A,B)$ is a component of a Hausdorff distance. More precisely, $h(A,B)=\max_{b \in A}(\min_{b \in B}(d(a,b)))$ and $d(a,b)$ is the Euclidean distance between points a and b, i.e. the vertices of strokes A and B. Of course, one of ordinary skill in the art will recognize that the Hausdorff distance is one of many choices of similarity measures that are available.

Figure 5:
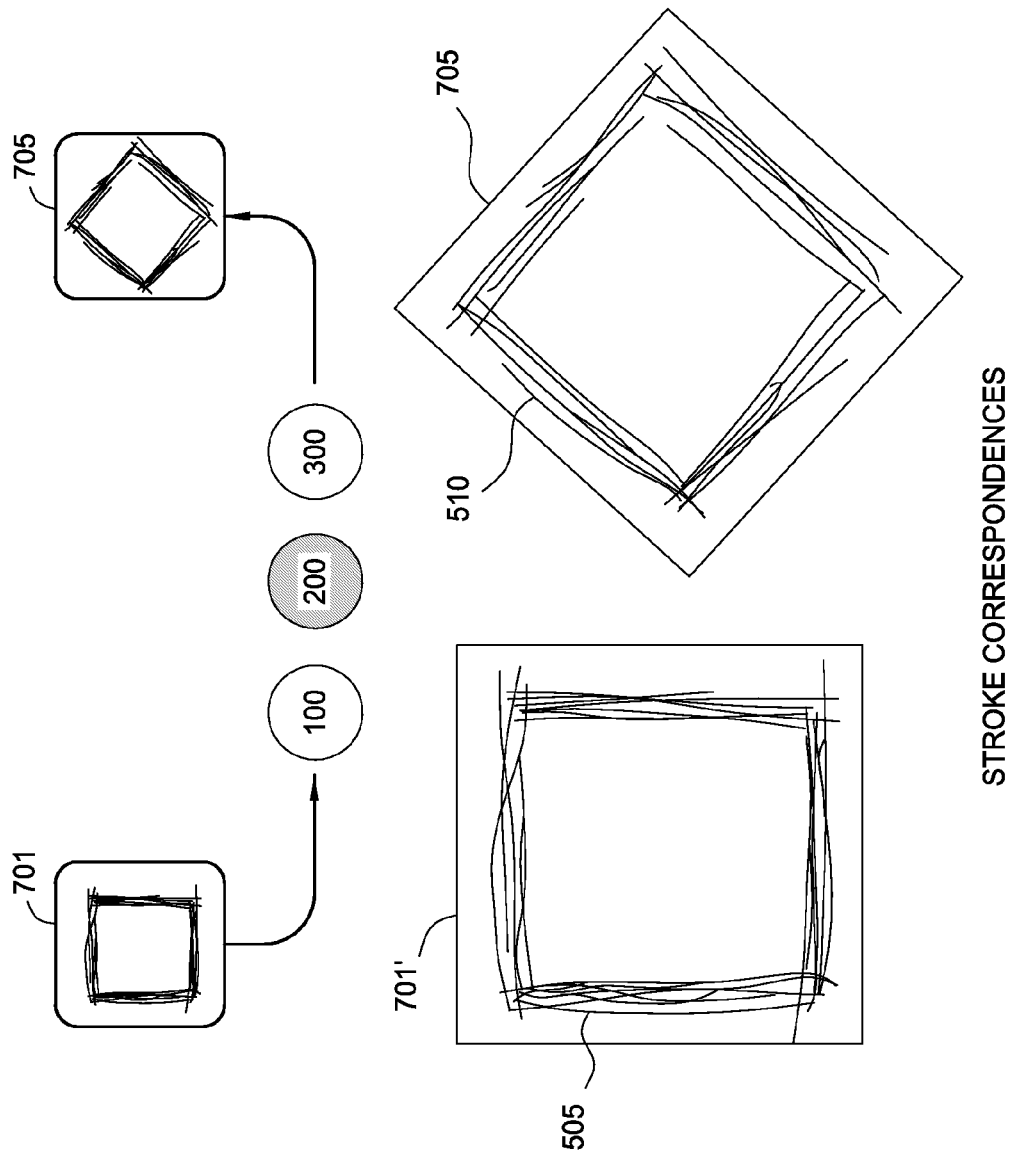
FIG. 5 illustrates an example of determining stroke correspondence between two representative frames, according to one embodiment.

FIG. 5 illustrates an example of stroke correspondence (step 200) determined between two frames, according to one embodiment. In this example, strokes from frame 701 are matched to strokes in frame 702. Note, the stroke-to-stroke correspondence may be 1:1 (in cases where both frames share the same number of strokes) 1:many (where there are more strokes in the ending frame), or many:1 (where there are more stokes in the initial frame). In this example, strokes from frame 701 are matched to strokes in frame 705, by comparing the final position of the vertices of a stroke determined using the motion flow field. As a specific example, the stroke 505 of frame 701' is determined to correspond to stroke 510 of frame 705'. Once a correspondence is determined for each stroke in the frames, in-between frames may be generated by interpolating between corresponding strokes.

In one embodiment, a stroke correspondence algorithm is used to find each pair of strokes that needs to be interpolated to create in-between frames. A variety of approaches for interpolating between corresponding stroke pairs may be used. In one embodiment, however, a three-step deformation method which interpolates between stroke curvatures may be used. An example of such a three-step deformation process is further described in WHITED, B., NORIS, G., SIMMONS, M., SUMNER, R. W., GROSS, M., AND ROSSIGNAC, J. 2010. Between it: "An interactive tool for tight inbetweening." In Proceedings of Eurographics, Computer Graphics Forum, (Whited, '10), which is incorporated by reference in its entirety. The approach in Whited '10 generally creates smooth blends for each pair of strokes determined to correspond to one another. In addition to interpolating the stroke curvatures, the approach of Whited '10 also computes global motion between pairs of strokes along logarithmic spiral trajectories, thus capturing the affinity of the global motion (rotation, translation and uniform scaling).

Figure 6:
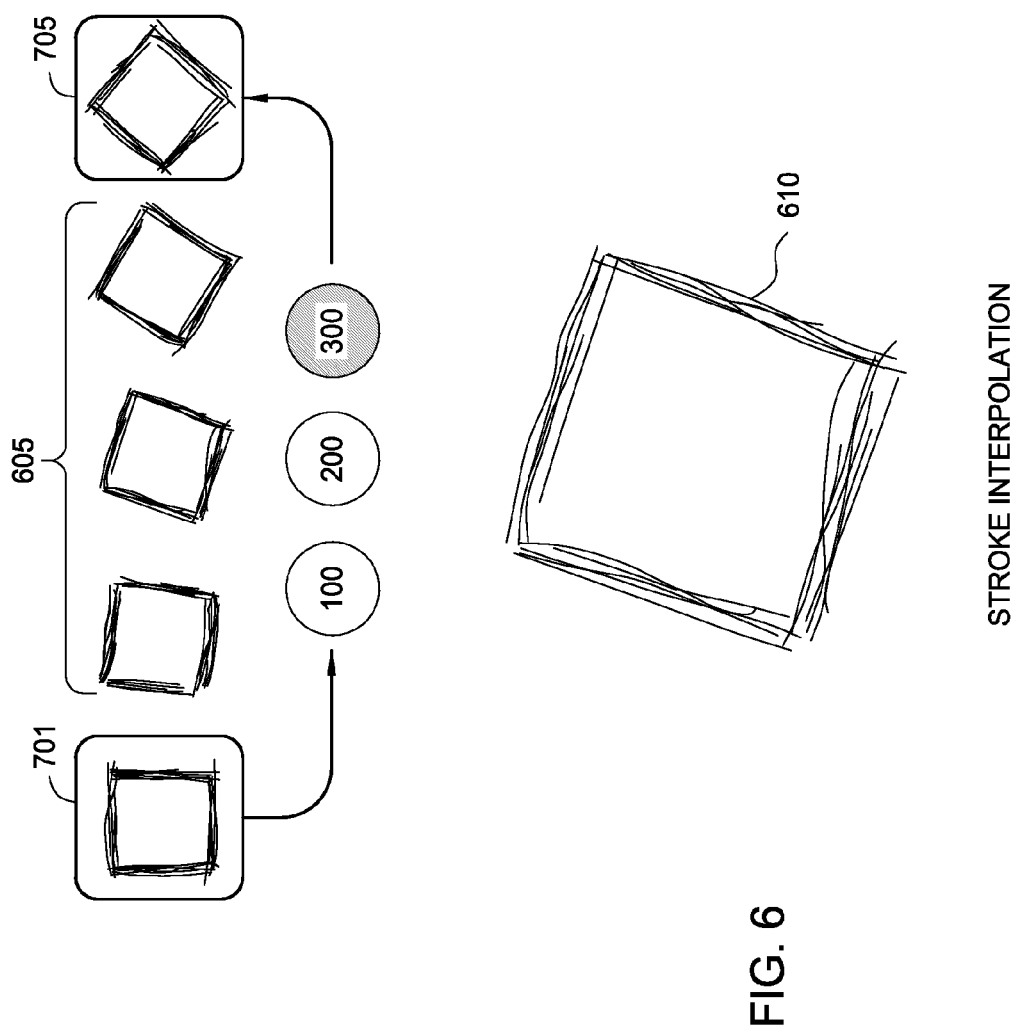
FIG. 6 illustrates an example of stroke interpolation performed to create a noise free sequence of synthesized animation frames between two representative frames, according to one embodiment.

FIG. 6 illustrates an example of stroke interpolation (step 300) performed to create a noise free sequence of synthesized animation frames between two representative frames, according to one embodiment. As shown, in-between frames 605 are generated by interpolating between corresponding strokes of frame 701 and frame 705. For example, frame 610 represents one of the frames 605 generated during the interpolation process.

Figure 9:
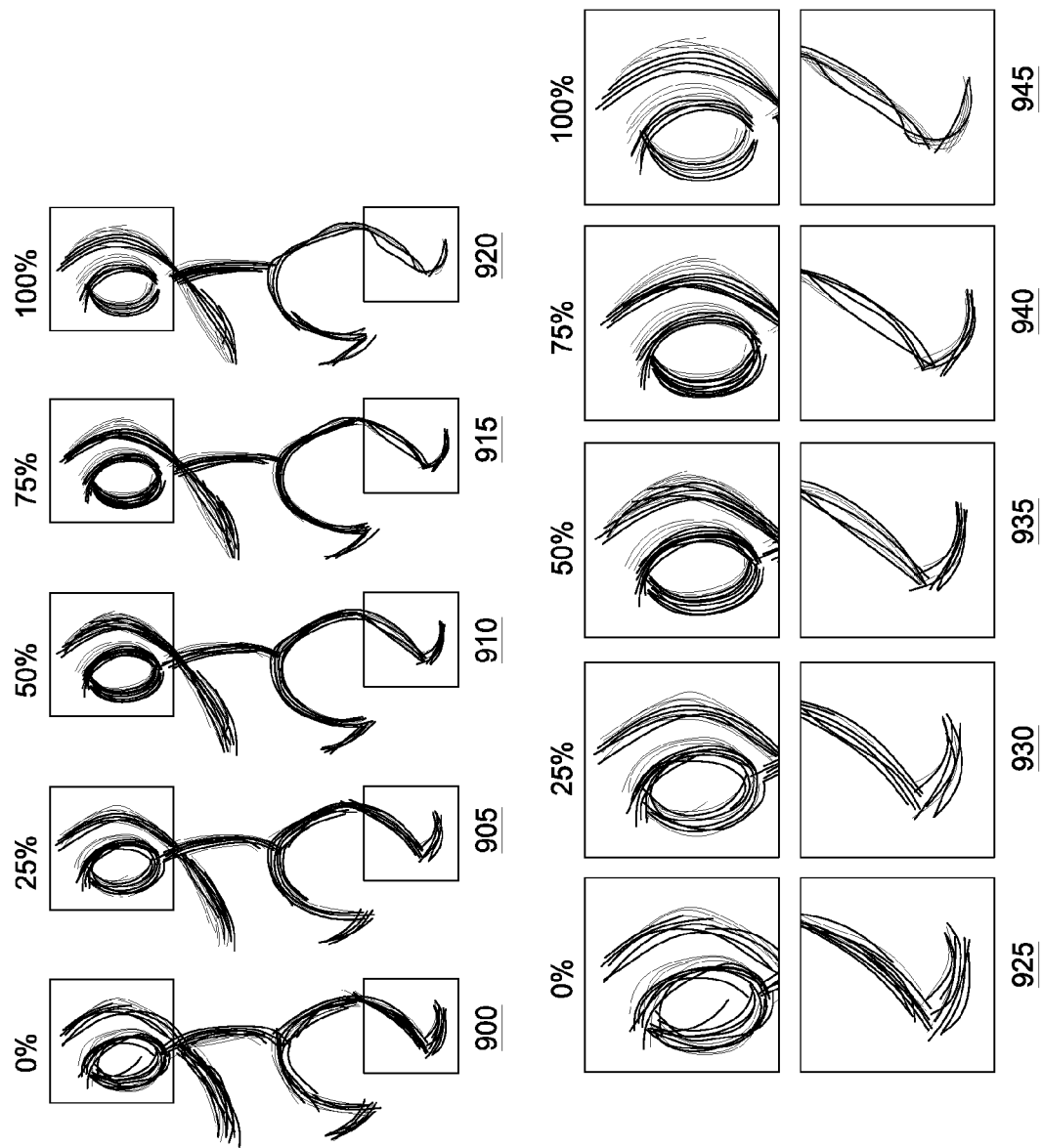
FIG. 9 illustrates another example of varying noise in an animation frame, according to one embodiment.

As noted, the processes of motion extraction (step 100), stroke correspondence (step 200), and stroke interpolation (step 300) may be performed to create a noise free sequence between two frames of an input animation, as well as to create in-between frames between each frame of the input sequence and a corresponding noise free frame. FIG. 9 illustrates another example of varying noise in an animation frame, according to one embodiment. As shown, an animation frame for a human stick figure is used to compare different noise reduction values from 0% (input animation frame 900) to 100% (noise-free frame 920). In between frames 905, 910, and 915 show frames with 25%, 50%, and 75%, respectively. Further, the head and left foot of the stick figure is shown for in views in 925-940. As the line work changes from the input animation frame 900 to the noise free frame 920, the temporal coherence of the line work becomes more congruent with the line work of the preceding and following frames of the animation. By selecting between the input animation frame 900 and the in-between frames 905-920, a user can edit the amount of temporal noise in the animation sequence.

Figure 8:
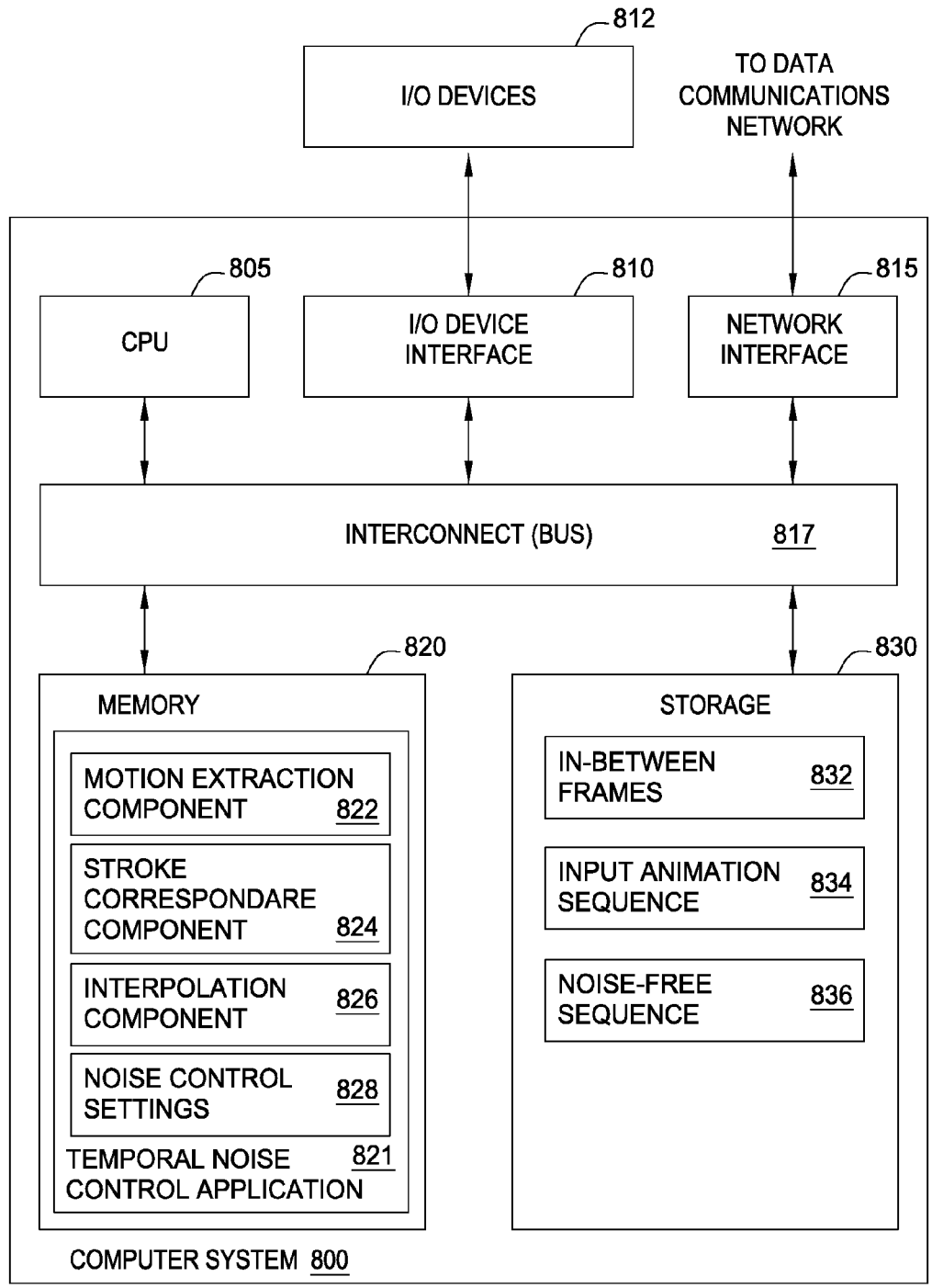
FIG. 8 illustrates an example computing system configured to generate animation sequences with configurable temporal noise, according to one embodiment.

FIG. 8 illustrates an example computing system configured to generate animation sequences with configurable temporal noise, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the I/O devices 812 may include tools used in creating digital animation sequences, e.g., an interactive touch sensitive tablet.

The CPU 805 retrieves and executes programming instructions stored in the memory 820 as well as stores and retrieves application data residing in the memory 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like. And the memory 802 is generally included to be representative of a random access memory. The storage 830 may be a disk drive storage device. Although shown as a single unit, the storage 830 may be a combination of fixed and/or removable storage devices, such as fixed disc drives, flash memory, removable memory cards, or optical storage, network attached storage (NAS), or a storage area-network (SAN).

As shown, the memory 820 includes a temporal noise control application 821, which itself includes a motion extraction component 822. And the storage 830 includes an input animation sequence, 834, a noise free animation sequence 836, and in-between frames 832. The temporal noise control application 821 generally provides one or more software applications configured to generate animation sequences with temporal noise that can be varied according to user preference using to the techniques described above.

Illustratively, the temporal noise control application 821 includes a stroke correspondence component 824, an interpolation component 826, and a collection of noise control settings 828. The motion extraction component 822 provides a software application configured to determine a motion flow field $M_{F_1}^{F_2}$ between two representative frames for stroke vertices in the line work of such frames. The stroke correspondence component 824 provides software configured to determine strokes to interpolate in creating in-between frames, e.g., between input key frames (to generate a noise-free sequence 836 between frames of an input sequence 834) or between an input frame and a corresponding noise-free frame (to generate in-between frames 832 of varying noise). The interpolation component 826 provides a software component configured to generate the interpolated frames using the determined stroke-to-stroke correspondence.

After generating the noise free sequence 836 and the in-between frames 832, the noise-control settings 828 may be used to specify the amount of temporal noise in an animation sequence by varying between the input animation sequence 834, the noise free sequence 836, and the in-between frames 832.

Advantageously, embodiments presented herein provide techniques to control the amount of temporal noise present in sketchy animations. For example, a sketchy animation sequence in a digital form may be used as input to produce an altered version of the same animation sequence with temporal coherence enforced down to the stroke level, resulting in a reduction (or elimination) of the perceived noise. The amount of noise reduction is variable over the animation and can be controlled via a single parameter to achieve a desired artistic effect.

While the foregoing disclosure presents various embodiments, other and further embodiments may be devised without departing from the basic scope thereof, and the scope thereof is determined by the claims that follow.

What is claimed is:

1. A method for reducing temporal noise in an animation sequence, the method comprising:
    generating, for at least a first pair of frames in the animation sequence, a substantially noise-free animation sequence between the first pair of frames;
    determining a stroke-to-stroke correspondence between a plurality of drawing strokes in frames of the substantially noise-free animation sequence and corresponding frames of the animation sequence based on a motion field computed between the frames of the substantially noise-free animation sequence and the corresponding frames of the animation sequence; and
    generating, for each frame in the animation sequence between the frames of the first pair of frames, a respective in-between frame based on the respective frame of the animation sequence
    and a frame from the generated substantially noise-free animation sequence corresponding to a time of the respective frame, based on the stroke-to-stroke correspondence and using an interpolation parameter to control a level of temporal noise present within a resulting animation sequence inclusive of the generated in-between frames.

2. The method of claim 1, wherein generating the substantially noise-free animation sequence between the first pair of frames comprises:
    computing a motion field between the first pair of frames;
    determining, from the motion field, a stroke-to-stroke correspondence between a plurality of drawing strokes in the first pair of frames; and
    generating a plurality of animation frames in between the first pair of frames by interpolating between drawing strokes having the determined stroke-to-stroke correspondence in the first pair of frames.

3. The method of claim 2, wherein the motion field specifies a motion for one or more vertices of one or more line strokes in the first pair of frames.

4. The method of claim 1, wherein generating, for each frame in the substantially noise-free animation sequence and a corresponding frame in the animation sequence comprises:
    generating a plurality of animation frames in between the substantially noise-free animation sequence and the corresponding frame in the animation sequence by interpolating between drawing strokes having the determined stroke-to-stroke correspondence in the first pair of frames.

5. The method of claim 4, wherein the motion field specifies a motion for one or more vertices of one or more line strokes in the substantially noise-free animation sequence and the corresponding frame in the animation sequence.

6. The method of claim 1, wherein the first pair of frames are selected every N frames of the animation sequence.

7. The method of claim 1, wherein the first pair of frames are selected as animation key frames.

8. The method of claim 1, further comprising, varying the temporal noise in the animation sequence by selecting each frame of the animation sequence as one of an original frame of the animation sequence, a generated noise-free frame of the noise free sequence, and one of the one or more in-between frames.

9. A non-transitory computer-readable medium storing one or more applications, which, when executed on a processor, perform operations for reducing temporal noise in an animation, the operation comprising:
    generating, for at least a first pair of frames in the animation sequence, a substantially noise-free animation sequence between the first pair of frames; and
    determining a stroke-to-stroke correspondence between a plurality of drawing strokes in frames of the substantially noise-free animation sequence and corresponding frames of the animation sequence, based on a motion field computed between the frames of the substantially noise-free animation sequence and the corresponding frames of the animation sequence; and
    generating, for each frame in the animation sequence between the frames of the first pair of frames, a respective in-between frame based on the respective frame of the animation sequence and a frame from the generated substantially noise-free animation sequence corresponding to a time of the respective frame, based on the stroke-to-stroke correspondence and using an interpolation parameter to control a level of temporal noise present within a resulting animation sequence inclusive of the generated in-between frames.

10. The non-transitory computer-readable medium of claim 9, wherein generating the substantially noise-free animation sequence between the first pair of frames comprises:
computing a motion field between the first pair of frames;
determining, from the motion field, a stroke-to-stroke correspondence between a plurality of drawing strokes in the first pair of frames; and
generating a plurality of animation frames in between the first pair of frames by interpolating between drawing strokes having the determined stroke-to-stroke correspondence in the first pair of frames.

11. The non-transitory computer-readable medium of claim 10, wherein the motion field specifies a motion for one or more vertices of one or more line strokes in the first pair of frames.

12. The non-transitory computer-readable medium of claim 9, wherein generating, for each frame in the substantially noise-free animation sequence and a corresponding frame in the animation sequence comprises:
generating a plurality of animation frames in between the substantially noise-free animation sequence and the corresponding frame in the animation sequence by interpolating between drawing strokes having the determined stroke-to-stroke correspondence in the first pair of frames.

13. The non-transitory computer-readable medium of claim 12, wherein the motion field specifies a motion for one or more vertices of one or more line strokes in the substantially noise-free animation sequence and the corresponding frame in the animation sequence.

14. The non-transitory computer-readable medium of claim 9, wherein the first pair of frames are selected every N frames of the animation sequence.

15. The non-transitory computer-readable medium of claim 9, wherein the first pair of frames are selected as animation key frames.

16. The non-transitory computer-readable medium of claim 9, wherein the operation further comprises, varying the temporal noise in the animation sequence by selecting each frame of the animation sequence as one of an original frame of the animation sequence, a generated noise-free frame of the noise free sequence, and one of the one or more in-between frames.

17. A system, comprising:
a processor and
a memory storing one or more applications, which, when executed on the processor, perform operations for reducing temporal noise in an animation sequence, the operation comprising:
generating, for at least a first pair of frames in the animation sequence, a substantially geometric noise-free animation sequence between the first pair of frames, and
determining a stroke-to-stroke correspondence between a plurality of drawing strokes in frames of the substantially noise-free animation sequence and corresponding frames of the animation sequence, based on a motion field computed between the frames of the substantially noise-free animation sequence and the corresponding frames of the animation sequence; and
generating, for each frame in the animation sequence between the frames of the first pair of frames, a respective in-between frame based on the respective frame of the animation sequence and a frame from the generated substantially noise-free animation sequence corresponding to a time of the respective frame, based on the stroke-to-stroke correspondence and using an interpolation parameter to control a level of temporal noise present within a resulting animation sequence inclusive of the generated in-between frames.

18. The system of claim 17, wherein generating the substantially noise-free animation sequence between the first pair of frames comprises:
computing a motion field between the first pair of frames;
determining, from the motion field, a stroke-to-stroke correspondence between a plurality of drawing strokes in the first pair of frames; and
generating a plurality of animation frames in between the first pair of frames by interpolating between drawing strokes having the determined stroke-to-stroke correspondence in the first pair of frames.

19. The system of claim 18, wherein the motion field specifies a motion for one or more vertices of one or more line strokes in the first pair of frames.

20. The system of claim 17, wherein generating, for each frame in the substantially noise-free animation sequence and a corresponding frame in the animation sequence comprises:
generating a plurality of animation frames in between the substantially noise-free animation sequence and the corresponding frame in the animation sequence by interpolating between drawing strokes having the determined stroke-to-stroke correspondence in the first pair of frames.

21. The system of claim 20, wherein the motion field specifies a motion for one or more vertices of one or more line strokes in the substantially noise-free animation sequence and the corresponding frame in the animation sequence.

22. The system of claim 17, wherein the first pair of frames are selected every N frames of the animation sequence.

23. The system of claim 17, wherein the first pair of frames are selected as animation key frames.

24. The system of claim 17, wherein the operation further comprises, varying the temporal noise in the animation sequence by selecting each frame of the animation sequence as one of an original frame of the animation sequence, a generated noise-free frame of the noise free sequence, and one of the one or more in-between frames.

* * * * *